Sept. 1, 1970 J. G. PUENTE ET AL 3,526,719
DOUBLE APERTURE TECHNIQUE FOR DETECTING STATION IDENTIFYING SIGNAL IN A TIME DIVISION MULTIPLE ACCESS SATELLITE COMMUNICATION SYSTEM
Filed Nov. 17, 1966
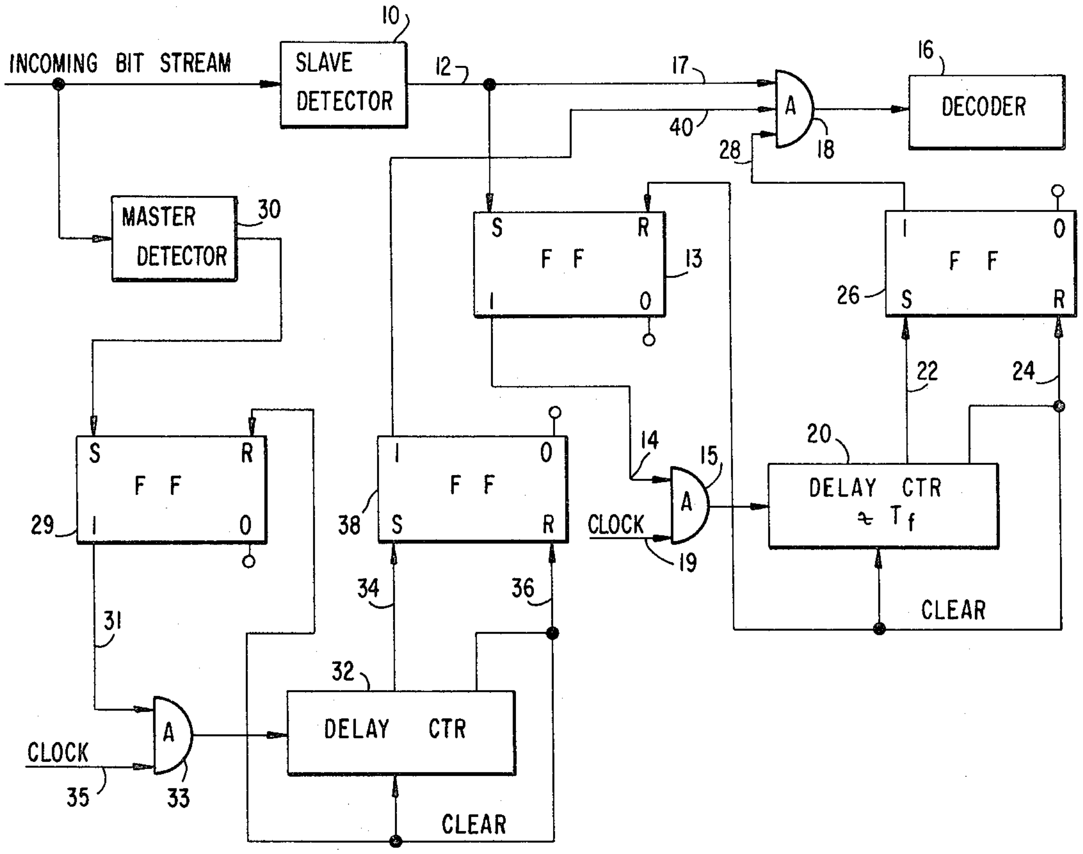
INVENTORS
JOHN G. PUENTE
WINFREID H. SCHREMPP
BY Sughrue, Rothwell, Mion, Zinn & Macpeak
ATTORNEYS 3,526,719

DOUBLE APERTURE TECHNIQUE FOR DETECTING STATION IDENTIFYING SIGNAL IN A TIME DIVISION MULTIPLE ACCESS SATELLITE COMMUNICATION SYSTEM

John G. Puente, Rockville, Md., and Winfried H. Schrempp, Bailey's Crossroads, Va., assignors to Communications Satellite Corporation, a corporation of Washington, D.C.

Filed Nov. 17, 1966, Ser. No. 595,133
Int. Cl. H04j 3/06
U.S. Cl. 179—15 9 Claims

ABSTRACT OF THE DISCLOSURE

An improved method and apparatus for decreasing the likelihood of error in detecting the unique word contained in a TDM signal burst transmitted from a slave earth station to an orbital satellite and relayed back to the station. The slave station also detects the master station unique word. The first bit pattern recognized as the slave station's unique word is delayed one TDM frame time to form a gate or aperture with a suitably delayed master station unique word at the time when the next slave station unique word should be detected. The master station unique word contains more bits than the slave station in order further to increase the reliability of this double aperture technique and further reduced the likelihood of falsely detecting a slave station unique word.

This invention relates generally to an improved technique for accurately detecting a station identifying signal in a TDM burst relayed from a satellite to an earth station in a time division multiple access satellite communication system and more particularly to such a technique in which a received identifying signal is detected in one time frame and then delayed a frame time to form a time gate with another suitably delayed identifying signal, during which time gate the station's identifying signal should be detected again.

The invention may be briefly and broadly summarized as an improved method and apparatus for verifying the detection of a station's identifying signal or unique word in a time division multiple access (TDMA) satellite communication system. In the preferred embodiment of the invention, the first bit code detected as a slave station's unique word is delayed one TDM frame time, and a detected master station unique word from the next frame is delayed the known time between the master station unique word and the slave station's true unique word in a frame. The delayed slave station unique word and the delayed master unique word are used as two conditions to form a time gate i.e. a double aperture, during which the slave station unique word should be detected in said next frame. The gate is made several bits wide to allow for timing uncertainties in the system. If a slave station unique word is detected in the time gate, then the station's decoder is activated to start decoding the information bits which closely follow the unique word in each frame. If the first bit code were falsely detected as a unique word, no output would occur during the time gate, and the station's decoder would not be activated.

Other objects, features and advantages of the invention will be apparent from the following more particular description of a preferred embodiment of the invention, as illustrated in the accompanying drawing.

In the drawing:

The figure illustrates a preferred embodiment of the improved double aperture technique.

In a present TDMA system, the transmission burst of each earth station contains a preamble portion and an information portion. One station is designated a master station and the others are designated slave stations. The preamble portion of each station contains a unique word consisting of bits arranged in code or pattern which uniquely identifies the transmitting station. In order to maintain system synchronization so that bursts of different stations do not overlap in the satellite, a novel burst synchronizer at each slave station detects the master unique word as well as its own unique word. The novel burst synchronizer is disclosed and claimed in a copending application Ser. No. 594,921 filed on Nov. 16, 1966 by O. G. Gabbard, entitled "Synchronizer for TDMA Satellite Communication System" and assigned to the assignee of the present invention. However, it was noted that synchronization failed as the length of the unique word code was reduced. For example, in one test, synchronization failed when the number of bits was reduced to twelve. This loss of synchronization is due to the fact that as the length of the unique word decreases, the probability of false detection increases, and the previously used single aperture was not accurate enough to maintain synchronization. Consequently, it is the object of this invention to provide an improved detecting method and apparatus which decreases the likelihood of detecting a false unique word, while permitting the number of bits required for the unique word of each slave station transmission burst to be kept at a relatively low number, thus increasing the TDM communication efficiency for a TDMA system incorporating a large number of earth stations.

In the prior single aperture accessing technique, a slave station transmits its unique word to the satellite and then attempts to detect its own unique word after it is relayed from the satellite. It is possible that the combination of bits forming the unique word would be found in the intelligence portion of its own or some other station's burst in the TDM frame time. Consequently, the unique word detector at the slave station might detect the wrong pattern of bits as its unique word. In the single aperture technique, the first detection of a unique word was delayed by one frame time and used to form a time gate in the next frame time in the same relative time slot in which the first detection was made. The time gate covered only a small portion of the second time frame thereby decreasing the likelihood of false detection compared to a method not including the aperture technique. If another unique word was, in fact, detected during this time gate, then it was assumed that a true unique word had been detected in the second frame. The station decoder was then activated to decode the information bits following the unique word in the burst. Of course, the longer the unique word is made, i.e. the more bits in the word, the lower the probability that a random combination of bits will look like the desired unique word. The shorter the unique word is made, the more confused the station unique word detector becomes in initially detecting a true unique word.

The number of bits contained in the gate time is termed the aperture of the gating signal. The aperture must be sufficiently wide to allow for uncertainties due to burst correction by the synchronizer and the relation between the local bit clock and the recovered bit clock of the output of the station PSK demodulator. Bit timing recovery is disclosed and claimed in a pending application Ser. No. 594,829, filed on Nov. 16, 1966 by John G. Puente, entitled "Digital Phase Lock Loop for Bit Timing Recovery," and assigned to the assignee of the present invention.

The improved double aperture technique of this invention will be explained with reference to the figure. The incoming bit stream from the satellite is received by the receiver (not shown) of the station which has transmitted a burst containing its unique word to the satellite. The demodulated incoming bit stream is then applied to the slave station unique word detector 10 which is designed to detect only the unique word of its station. When detection occurs, an output bit pulse appears on conductor 12 which is connected to an input 17 of an AND gate 18 and to the set S input of a flip-flop 13 whose "1" output is connected to an input 14 of an AND gate 15. The other input 19 of gate 15 is driven by the station's local clock operating at the system transmitted bit rate. The resultant output pulse from AND gate 15 is applied to the input of a delay counter 20 which imparts a delay of approximately one frame time to the pulse. The delay counter has two output conductors 22 and 24 which are connected to the set S and reset R inputs, respectively, of a flip-flop 26. The "1" output of flip-flop 26 is connected to the input 28 of AND gate 18. When counter 20 reaches a state at which output line 22 is energized, flip-flop 26 is set to enable input 28 of AND gate 18.

Similarly, the master unique word is detected in a detector 30 to produce a master bit pulse which is fed to the set S input of a flip-flop 29 to set the flip-flop. The "1" output of flip-flop 29 is applied to input 31 of an AND gate to enable the gate when the flip-flop is set by the master pulse. The local clock drives the other input 35 of gate 33. The pulses from gate 33 drive a delay counter 32 having a delay approximately equal to the known nominal time interval between the master and slave unique words in a frame. This time interval is described as nominal since movement of the satellite may cause variations or uncertainties in the time required for a signal to make the round trip between a ground station and the satellite, thereby causing slight variations in the time interval between a master unique word and a slave station's unique word. As explained below, the time gate or aperture in this invention is made long enough to accommodate these variations. Delay counter 32 has output conductors 34 and 36 which are connected to the set S and reset R input, respectively, of a flip-flop 38. The "1" output of flip-flop 38 is connected to the input 40 of AND gate 18. When counter 32 reaches a state at which output line 34 is energized, flip-flop 38 is set to enable input 40 of AND gate 18.

Consequently, if another slave pulse appears on conductor 12 when both inputs 28 and 40 are enabled, the pulse passes through AND gate 18 to activate decoder 16 which then decodes the information bits following the unique word. In a present TDMA system, the frame time is 125 microseconds and the information bits in each burst are typically spaced three bits from the end of the unique word.

When counter 20 subsequently reaches the state in which conductor 24 is energized, then both counter 20 and flip-flop 26 are reset, thereby disabling AND input 28. Flip-flop 13 is also reset. Similarly, when counter 32 reaches a state such that conductor 36 is energized, then counter 32 and flip-flop 38 are reset, thereby disabling AND input 40. Flip-flop 29 is also reset. When one of the slave unique word detections is false, either AND input 28 or 40 is disabled, and the pulse on conductor 12 cannot pass through gate 18 to activate decoder 16.

The "time gate" or aperture is the time during which both AND inputs 28 and 40 are enabled. The aperture is formed by adjusting counters 20 and 32 so that the time during which their respective flip-flop 26 and 38 are both set is at least one bit longer than the length of the slave station unique word. Furthermore, it is desirable to have the aperture 3–5 bits longer than the unique word to allow for the uncertainties mentioned above.

With this arrangement, the number of bits in the slave station unique word may be reduced to, for example, 5 or 10 bits. The master station unique word may contain, for example, about 20 bits. Therefore, the communication efficiency of the system is increased by leaving more room in a slave station burst for information bits. Furthermore, since the known time interval between the master unique word and a slave unique word is used to position the gate or aperture, each slave station in a plural station system could use the same unique word.

It is also contemplated to be within the scope of this invention to form the time gate or aperture for a detected slave unique word pulse by using only the appropriately delayed detected master unique word pulse. In other words, the input 28 may be completely removed from the AND gate 18.

While the invention has been particularly shown and described with reference to a preferred embodiment thereof, it will be understood by those skilled in the art that various changes in form and details may be made therein without departing from the spirit and scope of the invention.

What is claimed is:

1. In a time division multiple access satellite communication system including a master earth station and a plurality of slave earth stations intercommunicating through a communication satellite, each station including in its TDM transmission burst a unique word signal identifying that station, each slave station including means for detecting its own unique word and the unique word of a master station, the bursts of the stations interleaving in the satellite in a time frame in which there is a predetermined nominal time interval between a master station unique word and each slave station unique word, the improved method of verifying the detection of the unique word comprising:

(a) detecting at a slave station a first signal from the satellite as the unique word of that slave station, (b) detecting at said slave station a master signal from the satellite as the unique word of a master station, (c) detecting at said slave station a second signal from the satellite as the unique word of said slave station, and (d) recognizing said second signal as a true unique word of said slave station only if said second signal is detected one time frame after said first signal and also a predetermined nominal time interval after the detection of said master signal.

2. The improved method as defined in claim 1 wherein said signals each consist of a plurality of bits and further comprising transmitting a master signal with more bits than either of said first and second signals.

3. The improved method as defined in claim 1 further comprising:

(a) delaying the detected first signal one time frame, (b) delaying the detected master signal said predetermined nominal time interval, and (c) comparing said second signal with the delayed first and master signals to determine whether said second signal should be recognized as a true unique word of said slave station.

4. The improved method as defined in claim 3 further comprising decoding information signals associated with said second signal only if said second signal coincides in time with the delayed first and master signals.

5. In a time division multiple access satellite communication system including a master earth station and a plurality of slave earth stations intercommunicating through a communication satellite, each station including in its TDM transmission burst a unique word signal identifying that station, each slave station including means for detecting its own unique word and the unique word of a master station, the bursts of the stations interleaving in the satellite in a time frame in which there is a predetermined time interval between a master station unique word and each slave station unique word, the improved method of verifying the detection of the unique word comprising:

(a) transmitting a master station unique word containing a greater number of bits than each of the slave station unique words, (b) detecting at a slave station its own unique word and the master station unique word, and (c) recognizing the slave station unique word as the true unique word of that slave station only if it occurs within a time gate a predetermined time interval after the master station unique word is detected.

6. The improved method as defined in claim 5 further comprising delaying said master station unique word said predetermined time interval to form said time gate having a time period substantially less than the TDM transmission burst time of said slave station.

7. In a time division multiple access satellite communication system including a master earth station and a plurality if slave earth stations intercommunicating through a communication satellite, each station including in its TDM transmission burst a unique word signal identifying that station, each slave station including means for detecting its own unique word and the unique word of a master station, the bursts of the stations interleaving in the satellite in a time frame in which there is a predetermined time interval between a master station unique word and each slave station unique word, an apparatus for verifying the detection of the unique word comprising:

(a) means for detecting at a slave station a first signal from the satellite as the unique word of that slave station, (b) means for detecting at said slave station a master signal from the satellite as the unique word of a master station, (c) means for detecting at said slave station a second signal from the satellite as the unique word of said slave station, and (d) means coupled to the detecting means of paragraphs (a), (b) and (c) for recognizing said second signal as a true unique word of said slave station only if said second signal is detected one time frame after said first signal and also a predetermined time interval after the detection of said master signal.

8. The apparatus as defined in claim 7 further comprising:

(a) means for delaying the detecting first signal one time frame, (b) means for delaying the detected master signal said predetermined time interval, and (c) means for comparing said second signal with the delayed first and master signals to determine whether said second signal should be recognized as a true unique word of said slave station.

9. In a time division multiple access satellite communication system including a master earth station and a plurality of slave earth stations intercommunicating through a communication satellite, each station including in its TDM transmission burst a unique word signal identifying that station, each slave station including means for detecting its own unique word and the unique word of a master station, the bursts of the stations interleaving in the satellite in a time frame in which there is a predetermined time interval between a master station unique word and each slave station unique word, an apparatus for verifying the detecting of the unique word comprising:

(a) means for detecting at a slave station a master station unique word in a time frame, (b) means for detecting at the slave station a slave station unique word, and (c) means for forming from the detected master unique word a time gate having a time period substantially less than the TDM transmission burst time of said slave station, said time gate occurring a predetermined time interval after the master station unique word is detected so that the detected slave station unique word is recognized as a true slave station unique word only if it occurs within said time gate.

References Cited

UNITED STATES PATENTS

| | | | |
|---|---|---|---|
| 2,979,565 | 4/1961 | Zarcone | 179—15 |
| 3,048,786 | 8/1962 | Berinson et al. | 179—15 |
| 3,188,569 | 6/1965 | Mahony | 179—15 |
| 3,261,918 | 7/1966 | Sisti | 179—15 |
| 3,306,978 | 2/1967 | Simmonds et al. | 179—15 |
| 3,418,579 | 12/1968 | Hultberg | 325—52 |

FOREIGN PATENTS 1,195,373 6/1965 Germany.

RALPH D. BLAKESLEE, Primary Examiner

U.S. Cl. X.R.

325—42, 58